United States Patent
Xiao

(10) Patent No.: US 11,177,684 B2
(45) Date of Patent: Nov. 16, 2021

(54) PARALLEL BATTERY CHARGING CIRCUIT AND CHARGING METHOD THEREOF

(71) Applicant: SHANGHAI HUIRUI SEMICONDUCTOR TECHNOLOGY CO., LTD., Shanghai (CN)

(72) Inventor: Chuan Xiao, Shanghai (CN)

(73) Assignee: Shanghai Huiri Semiconductor Technology Co., LTD., Shanghai (CN)

( * ) Notice: Subject to any disclaimer, the term of this patent is extended or adjusted under 35 U.S.C. 154(b) by 106 days.

(21) Appl. No.: 16/789,447

(22) Filed: Feb. 13, 2020

(65) Prior Publication Data

US 2020/0185956 A1    Jun. 11, 2020

Related U.S. Application Data

(63) Continuation-in-part of application No. PCT/CN2018/093571, filed on Jun. 29, 2018.

(51) Int. Cl.
*H02J 7/00* (2006.01)
*H02J 7/34* (2006.01)

(52) U.S. Cl.
CPC ............ *H02J 7/345* (2013.01); *H02J 7/0013* (2013.01); *H02J 7/00711* (2020.01)

(58) Field of Classification Search
CPC ........................................ H02J 7/345
USPC ........................................ 320/128
See application file for complete search history.

(56) References Cited

U.S. PATENT DOCUMENTS

| | | | | |
|---|---|---|---|---|
| 6,346,794 B1* | 2/2002 | Odaohhara | ........... | H02J 7/0024 320/116 |
| 2009/0033289 A1* | 2/2009 | Xing | .................. | H02M 7/4837 320/140 |
| 2015/0180243 A1* | 6/2015 | Park | ........................ | H02J 7/008 320/107 |
| 2016/0033982 A1* | 2/2016 | Moon | .................. | H02M 3/156 323/281 |
| 2017/0338670 A1* | 11/2017 | Zhang | .................. | H02J 7/0027 |

FOREIGN PATENT DOCUMENTS

| CN | 1764035 A | 4/2006 |
|---|---|---|
| CN | 102593916 A | 7/2012 |
| CN | 104124734 A | 10/2014 |
| CN | 107394856 A | 11/2017 |

* cited by examiner

*Primary Examiner* — Yalkew Fantu

(57) ABSTRACT

The present disclosure provides a parallel battery charging circuit and charging method thereof. The charging circuit includes: a voltage conversion circuit, a voltage detection circuit, a feedback voltage selection circuit, and N charging current control circuits. By forming a differential feedback circuit composed of the voltage conversion circuit, the voltage detection circuit, and the feedback voltage selection circuit, an output voltage is adjusted according to a maximum error result, so that a voltage difference between the output voltage and a battery voltage corresponding to a maximum error result is a specified voltage difference, thereby starting charging from a battery with the lowest voltage.

17 Claims, 8 Drawing Sheets

PARALLEL BATTERY CHARGING CIRCUIT AND CHARGING METHOD THEREOF

CROSS REFERENCES TO RELATED APPLICATIONS

This application is a continuation-in-part application of international application PCT/CN2018/093571, filed on Jun. 29, 2018, claiming priority from Chinese Patent Application No. CN 2017107705276, entitled "Parallel Battery Charging Circuit and Charging Method thereof", filed with CNIPA on Aug. 31, 2017, and claiming priority from Chinese Patent Application No. CN 2017211069480, entitled "Parallel Battery Charging Circuit", filed with CNIPA on Aug. 31, 2017, the contents of which are incorporated herein by reference in their entireties.

BACKGROUND OF THE PRESENT DISCLOSURE

Field of Disclosure

The present disclosure relates to the field of battery charging technology, and in particular, to a parallel battery charging circuit and charging method thereof.

Description of Related Arts

As functions of portable rechargeable devices, such as mobile phones, increase, power consumption of the portal devices also becomes increasingly higher. The battery capacity of portable devices is required to be higher. However, because an improvement in the performance of battery materials can hardly meet requirements of high-capacity batteries instantly, a high battery capacity and a high charging speed is a key for the current portable devices to gain an advantageous position in the consumer market.

SUMMARY OF THE PRESENT DISCLOSURE

The present disclosure provides a parallel battery charging circuit and charging method thereof, so as to resolve the problems of severe battery heating, low charging efficiency, occupation of a large space, and high costs.

In order to accomplish the above and other objects, the present disclosure provides a parallel battery charging circuit, comprising: a voltage conversion circuit, configured to adjust an output voltage according to a maximum error result output by a feedback voltage selection circuit, so that a voltage difference between the output voltage and a battery voltage corresponding to the maximum error result is a specified voltage difference, thereby starting charging from a battery with the lowest voltage; a voltage detection circuit, connected to an output end of the voltage conversion circuit and positive electrodes of N batteries, and configured to sample battery voltages of the N batteries, and detect errors between the output voltage and N battery voltages according to the specified voltage difference, to generate and output N error results; a feedback voltage selection circuit, having an input end connected to the voltage detection circuit and an output end connected to the voltage conversion circuit, and configured to compare the N error results output by the voltage detection circuit, and output a maximum error result; and N charging current control circuits, each charging current control circuit is connected to the output end of the voltage conversion circuit and a positive electrode of a battery, the charging current control circuit is configured to sample a battery voltage or a battery current of the charged battery, detect an error between the battery voltage and the specified voltage difference, or the error between the battery current and a specified current value, to adjust the charging current of the charged battery, so that the charging current is equal to the specified current value, thereby implementing constant current charging; wherein N is an integer greater than or equal to 2.

Preferably, the voltage conversion circuit comprises: a pulse width modulation circuit, connected to the feedback voltage selection circuit, and configured to adjust a duty cycle of an output signal of the pulse width modulation circuit according to the maximum error result output by the feedback voltage selection circuit; and an output voltage adjustment circuit, connected to the pulse width modulation circuit, and configured to adjust the output voltage according to the output signal of the pulse width modulation circuit, so that the voltage difference between the output voltage and the battery voltage corresponding to the maximum error result is the specified voltage difference.

Preferably, the pulse width modulation circuit comprises a first error amplifier; a first input end of the first error amplifier is connected to a reference voltage; a second input end of the first error amplifier is connected to the output end of the feedback voltage selection circuit; an output end of the first error amplifier is connected to a first input end of a first comparator; a second input end of the first comparator is connected to a ramp generator; an output end of the first comparator is connected to an input end of a pulse width modulator; and an output end of the pulse width modulator is used as an output end of the pulse width modulation circuit.

Preferably, the output voltage adjustment circuit comprises a drive circuit; an input end of the drive circuit is connected to the output end of the pulse width modulator; an output end of the drive circuit is connected to an input end of a phase inverter and a gate of a first MOS transistor; an output end of the phase inverter is connected to a gate of a second MOS transistor; a first connection end of the second MOS transistor is connected to a voltage Vdd; a second connection end of the second MOS transistor is connected to a first connection end of the first MOS transistor, and connected to a first connection end of a first inductor; a second connection end of the first MOS transistor is connected to a reference ground; a second connection end of the first inductor is connected to a first connection end of a first capacitor and used as an output end of the output voltage adjustment circuit; and a second connection end of the first capacitor is connected to the reference ground.

Preferably, the pulse width modulation circuit is implemented by using a microprocessor.

Preferably, the output voltage adjustment circuit comprises a third MOS transistor; a gate of the third MOS transistor is connected to the microprocessor; a first connection end of the third MOS transistor is connected to a voltage Vdd; a second connection end of the third MOS transistor is connected to a first connection end of a fourth MOS transistor and is also connected to a first connection end of a second inductor; a gate of the fourth MOS transistor is connected to the microprocessor; a second connection end of the fourth MOS transistor is connected to a reference ground; a second connection end of the second inductor is connected to a first connection end of a second capacitor and is also used as an output end of the output voltage adjustment circuit; and a second connection end of the second capacitor is connected to the reference ground.

Preferably, the voltage detection circuit comprises N voltage detection units with the same circuit structure, and each voltage detection unit is connected to the output end of the voltage conversion circuit and a battery; the voltage detection unit comprises a first voltage source; a positive electrode of the first voltage source is connected to the output end of the voltage conversion circuit; a negative electrode of the first voltage source is connected to a first input end of a second error amplifier; a second input end of the second error amplifier is connected to a positive electrode of a battery; an output end of the second error amplifier is used as an output end of the voltage detection unit; and a voltage of the first voltage source is the specified voltage difference.

Preferably, the voltage detection circuit comprises N third error amplifiers; each of the first input ends of the N third error amplifiers is connected to the output end of the voltage conversion circuit; each of the second input ends of the N third error amplifiers are connected to positive electrodes of N parallel batteries; output ends of the N third error amplifiers are connected to input ends of N first analog-to-digital conversion circuits respectively; each of the output ends of the N first analog-to-digital conversion circuits are connected to a first microprocessor; and the first microprocessor is configured to compare N output signals output by the first analog-to-digital conversion circuits with the specified voltage difference and generate N error results.

Preferably, the voltage detection circuit comprises N fourth error amplifiers; first input ends of the N fourth error amplifiers are all connected to the output end of the voltage conversion circuit; second input ends of the N fourth error amplifiers are connected to positive electrodes of N parallel batteries respectively; output ends of the N fourth error amplifiers are connected to a gating end of a gating switch; a connection end of the gating switch is connected to an input end of a second analog-to-digital conversion circuit; an output end of the second analog-to-digital conversion circuit is connected to a second microprocessor; the second microprocessor is further connected to a control end of the gating switch; and the second microprocessor is configured to compare N output signals output by the second analog-to-digital conversion circuit with the specified voltage difference and generate N error results.

Preferably, the feedback voltage selection circuit comprises a second comparator and N switches; the second comparator comprises N input ends and N output ends; the N input ends of the second comparator each is connected to one of the N output ends of the voltage detection circuit in an one-to-one correspondence, and connected to one of the first connection ends of the N switches in an one-to-one correspondence; the N output ends of the second comparator are connected to control ends of the N switches respectively; and second connection ends of the N switches are connected to each other and used as the output end of the feedback voltage selection circuit.

Preferably, the feedback voltage selection circuit is implemented by using a microprocessor.

Preferably, the feedback voltage selection circuit comprises N diodes; positive electrodes of the N diodes each is connected to one of the N output ends of the voltage detection circuit in an one-to-one correspondence, and negative electrodes of the N diodes are connected to each other and used as the output end of the feedback voltage selection circuit.

Preferably, the charging current control circuit comprises a fifth MOS transistor, a sixth MOS transistor, a fifth error amplifier, and a first resistor; a first connection end of the fifth MOS transistor is connected to a first connection end of the sixth MOS transistor, and is also connected to the output end of the voltage conversion circuit; a second connection end of the fifth MOS transistor is connected to a positive electrode of a battery; a second connection end of the sixth MOS transistor is connected to a first input end of the fifth error amplifier and a first connection end of the first resistor; a second connection end of the first resistor is connected to a reference ground; a second input end of the fifth error amplifier is connected to a specified current value; a gate of the fifth MOS transistor is connected to a gate of the sixth MOS transistor, and is connected to an output end of the fifth error amplifier.

Preferably, the charging current control circuit comprises a seventh MOS transistor; a first connection end of the seventh MOS transistor is connected to the output end of the voltage conversion circuit; a second connection end of the seventh MOS transistor is connected to a positive electrode of a second voltage source and a first connection end of a second resistor; a negative electrode of the second voltage source is connected to a first input end of a sixth error amplifier; a second connection end of the second resistor is connected to a positive electrode of a battery and a second input end of the sixth error amplifier; an output end of the sixth error amplifier is connected to a gate of the seventh MOS transistor; and a voltage of the second voltage source is the specified voltage difference.

The present disclosure further provides a charging method for the parallel batteries, comprising: sampling battery voltages of N parallel batteries, and detecting errors between an output voltage and the battery voltages according to a specified voltage difference, to generate N error results; comparing the N error results, and adjusting the output voltage according to a maximum error result, so that a voltage difference between the output voltage and a battery voltage corresponding to the maximum error result is the specified voltage difference, thereby starting charging from a battery with the lowest voltage; and sampling a battery voltage or a battery current of a charged battery, and detecting an error between the battery voltage or the battery current and the specified voltage difference or a specified current value, to adjust the charging current of the charged battery, so that the charging current is equal to the specified current value, thereby implementing constant current charging, wherein N is an integer greater than or equal to 2.

Preferably, the charging method further comprises a constant voltage charging mode, wherein in the constant voltage charging mode, the battery voltage is continuously increased to a battery fully-charged voltage, and the charging current is gradually decreased; and when the charging current is decreased to a specified charging cutoff current, charging of the battery is completed.

As described above, the parallel battery charging circuit and charging method thereof according to the present disclosure have the following beneficial effects:

1. According to the present disclosure, the voltage difference between the output voltage and the battery voltage corresponding to the maximum error result is a specified voltage difference, so that charging is started from a battery with the lowest voltage. Moreover, the specified voltage difference is small, the voltage difference between the charging voltage and the battery voltage is made to be as small as possible, so that the battery is charged rapidly and efficiently, and less heat is generated.

2. In the present disclosure, a charging current control circuit is disposed for each battery, the charging current of each battery is precisely controlled, which can prevent the charging current of one of the batteries from being excessively high caused by internal resistance changing after battery aging, thereby avoiding the battery generating too much heat.

3. The circuit in the present disclosure includes only one voltage conversion circuit. The circuit has a high integration. The chip has fewer peripheral components, thereby saving a lot of space and costs.

DESCRIPTIONS OF REFERENCE NUMERALS

Figure 1:
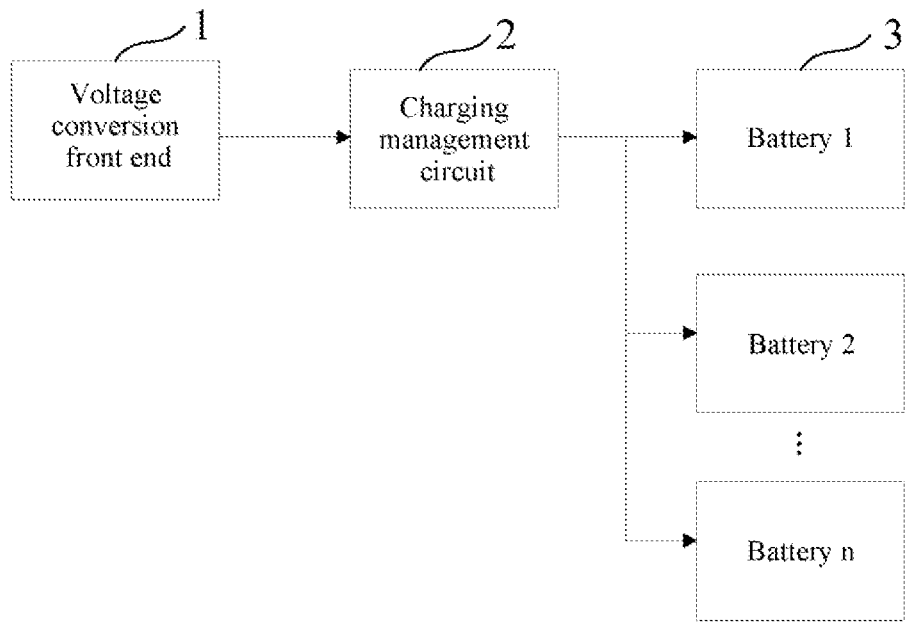
FIG. 1 is a circuit block diagram of a first charging mode.

1 Voltage conversion front end
2 Charging management circuit
3 Battery
4 Voltage conversion circuit
41 Pulse width modulation circuit
411 First error amplifier
412 First comparator
413 Ramp generator
414 Pulse width modulator
42 Output voltage adjustment circuit
421 Drive circuit
422 Phase inverter
5 Voltage detection circuit
51 Voltage detection unit
511 First voltage source
512 Second error amplifier
52 Third error amplifier
53 First analog-to-digital conversion circuit
54 First microprocessor
55 Fourth error amplifier
56 Second analog-to-digital converter
57 Second microprocessor
6 Feedback voltage selection circuit
61 Second comparator
7 Charging current control circuit
71 Fifth error amplifier
72 Second voltage source
73 Sixth error amplifier
M1 First MOS transistor
M2 Second MOS transistor
M3 Third MOS transistor
M4 Fourth MOS transistor
M5 Fifth MOS transistor
M6 Sixth MOS transistor
M7 Seventh MOS transistor
L1 First inductor
L2 Second inductor
C1 First capacitor
C2 Second capacitor
R1 First resistor
R2 Second resistor
K1 Gating switch
S1 to Sn First switch to $n^{th}$ switch
D1 to Dn First diode to $n^{th}$ diode

DETAILED DESCRIPTION OF THE PREFERRED EMBODIMENTS

Implementations of the present disclosure are illustrated below through specific examples. A person skilled in the art can easily understand other advantages and efficacy of the present disclosure according to the content disclosed in this specification. The present disclosure can also be implemented or applied through other different specific implementations. Various modifications or variations can also be made on details in this specification based on different opinions and applications without departing from the spirit of the present disclosure.

It should be noted that, the figures provided in the embodiments merely illustrate the basic conception of the present disclosure schematically. Therefore, the figures only show components related to the present disclosure, and are not drawn according to the quantity, shapes and sizes of components during actual implementation. The pattern, quantity and ratio of components during actual implementation can be changed arbitrarily, and the component layout may also be more complex.

FIG. 1 shows a first charging mode. After outputting a regulated voltage, a voltage conversion front end 1 is connected to a charging management circuit 2, to charge a plurality of parallel batteries 3. This charging mode has the following disadvantage: even batteries with similar voltages and internal resistances are selected to be connected in parallel at delivery, after dozens or even hundreds of times of cyclic charging and discharging, the internal resistances of the plurality of parallel batteries are no longer the same. Moreover, it is difficult to predict a specific value of the increase in the internal resistance. For example, internal resistances of batteries are 50 milliohm at delivery, after hundreds of normal cycles such as charging and discharging/heating and cooling within two years, especially after aging of the batteries, internal resistances of some batteries reach approximately 200 milliohm or higher, while internal resistances of some batteries do not increase obviously, which only reach 60 milliohm. However, a user is not aware of these at all.

In this case, if the plurality of parallel batteries is charged, a distribution of charging currents is greatly different from that at delivery. At delivery, because the plurality of parallel batteries has close internal resistances, the charging currents are usually evenly distributed among the plurality of batteries (for example, in popular quick charge with a current of 5 A nowadays, two batteries each with a capacity of 2500 mAh are simply connected in parallel and charged at delivery; a capacity of the parallel batteries reaches 5000 mAh, and the batteries each have a charging current of 2.5 A, 1 C charging is performed. There is no problem to select a 1 C cell as a battery). However, after the internal resistances of the batteries change, the charging currents of the batteries are no longer evenly distributed. A larger current is directly allocated to a battery with a smaller internal resistance during direct parallel charging. If the internal resistances become greatly different, most of the charging current flows to the battery with a smaller internal resistance, thus causing the battery to be overheated, and resulting in a safety hazard in charging. For example, the internal resistances of the batteries are both 50 milliohm at delivery, after repeated use and aging, the internal resistances of the batteries become 60 milliohm and 200 milliohm, respectively. The charging currents of the two batteries become 5 A*200/(200+60) =3.85 A and 5 A*60/(200+60)=1.15 A, respectively. The charging currents of the batteries change significantly (which turn to be 3.85 A and 1.15 A respectively) compared with the charging currents at delivery (which are both 2.5 A). For a 1 C cell with a capacity of 2500 mAh, a charging current is 3.85 A, which is much higher than a normal value (1.5 times the normal value). The charging current has greatly exceeded the safe charging current of the battery.

Figure 2:
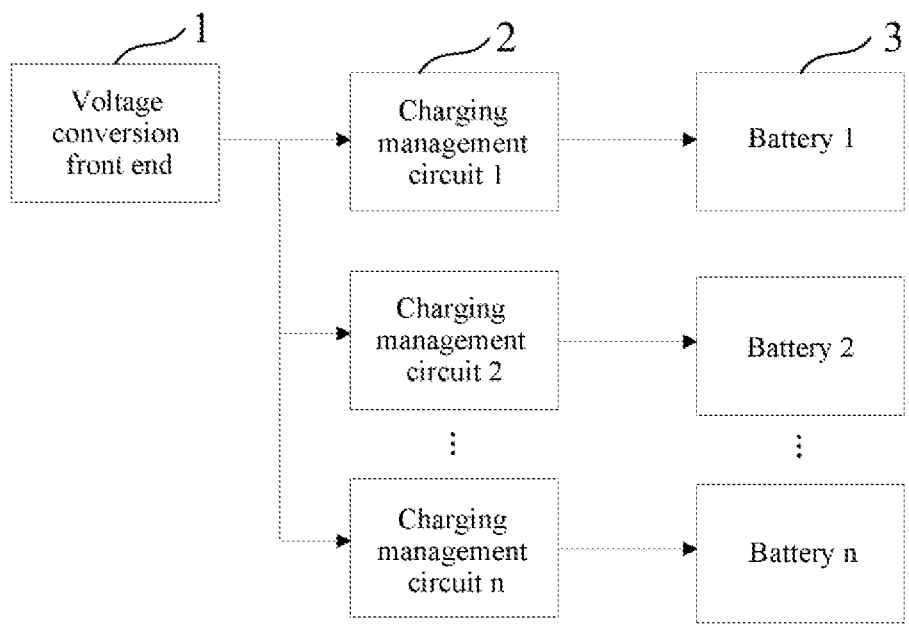
FIG. 2 is a circuit block diagram of a second charging mode.

FIG. 2 shows a second charging mode, in which the same voltage conversion front end 1 is used, while each battery 3 has an independent charging management circuit 2. After outputting a regulated voltage, the voltage conversion front end charges each battery independently through an independent charging management circuit. However, because there is no feedback between the charging management circuit and the voltage conversion front end, the voltage difference between the output voltage of the voltage conversion front end and the voltage of each battery is large, which will result in low charging efficiency. This charging mode is not applicable to high current charging. Otherwise, severe heat will be caused.

Figure 3:
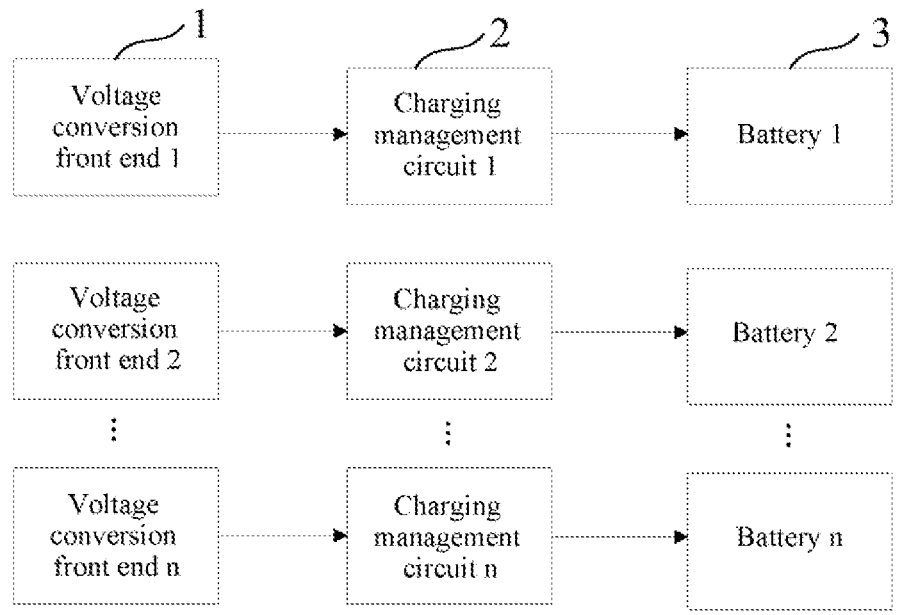
FIG. 3 is a circuit block diagram of a third charging mode.

FIG. 3 shows a third charging mode. To resolve the problems of heating and low efficiency in the second charging mode, each battery 3 is provided with an independent voltage conversion front end 1 and a charging management circuit 2, so that the battery is charged. This charging mode can resolve the problems in the first and second modes. However, since each battery has an independent voltage conversion front end, a plurality of independent voltage conversion front end circuits and corresponding components are required, thereby occupying large space. For the limited internal space of a mobile phone, this will sacrifice the battery space or mobile phone dimensions, and increase the cost.

Embodiment 1

Figure 4:
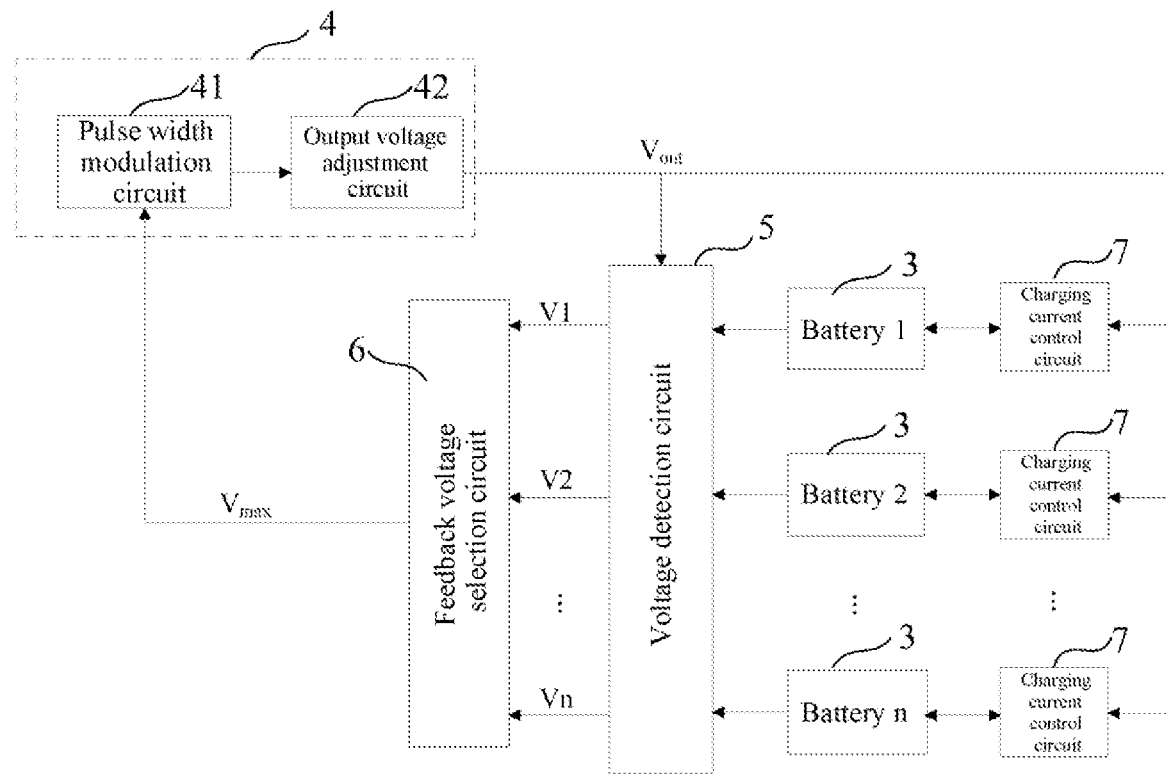
FIG. 4 is a circuit block diagram of a charging circuit according to the present disclosure.

As shown in FIG. 4, a parallel battery charging circuit is provided. The charging circuit comprises:

a voltage conversion circuit 4, configured to adjust an output voltage according to a maximum error result output by a feedback voltage selection circuit, so that the voltage difference between the output voltage and a battery voltage corresponding to the maximum error result is a specified voltage difference, so that the charging starts from a battery with the lowest voltage;

a voltage detection circuit 5, connected to an output end of the voltage conversion circuit 4 and positive electrodes of N batteries, the voltage detection circuit 5 is configured to sample battery voltages of the N batteries, and detect errors of the output voltage and N battery voltages according to the specified voltage difference, so as to generate and output N error results;

a feedback voltage selection circuit 6, having an input end connected to the voltage detection circuit 5, and an output end connected to the voltage conversion circuit 4, the feedback voltage selection circuit 6 is configured to compare the N error results output by the voltage detection circuit, and output the maximum error result; and N charging current control circuits 7, each charging current control circuit 7 is connected to the output end of the voltage conversion circuit 4 and a positive electrode of a battery, the charging current control circuit 7 is configured to sample a battery voltage or a battery current of the charged battery, and detect an error between the battery voltage and the specified voltage difference, or an error between the battery current and the specified current value, so as to adjust the charging current of the charged battery, so that the charging current is equal to the specified current value, thereby implementing constant current charging;

wherein N is an integer greater than or equal to 2.

In an example, as shown in FIG. 4, the voltage conversion circuit 4 includes:

a pulse width modulation circuit 41, connected to the feedback voltage selection circuit 6, the pulse width modulation circuit 41 is configured to adjust a duty cycle of an output signal of the pulse width modulation circuit according to the maximum error result output by the feedback voltage selection circuit; and an output voltage adjustment circuit 42, connected to the pulse width modulation circuit 41, the output voltage adjustment circuit 42 is configured to adjust the output voltage according to the output signal of the pulse width modulation circuit, so that the voltage difference between the output voltage and the battery voltage corresponding to the maximum error result is the specified voltage difference.

Figure 5:
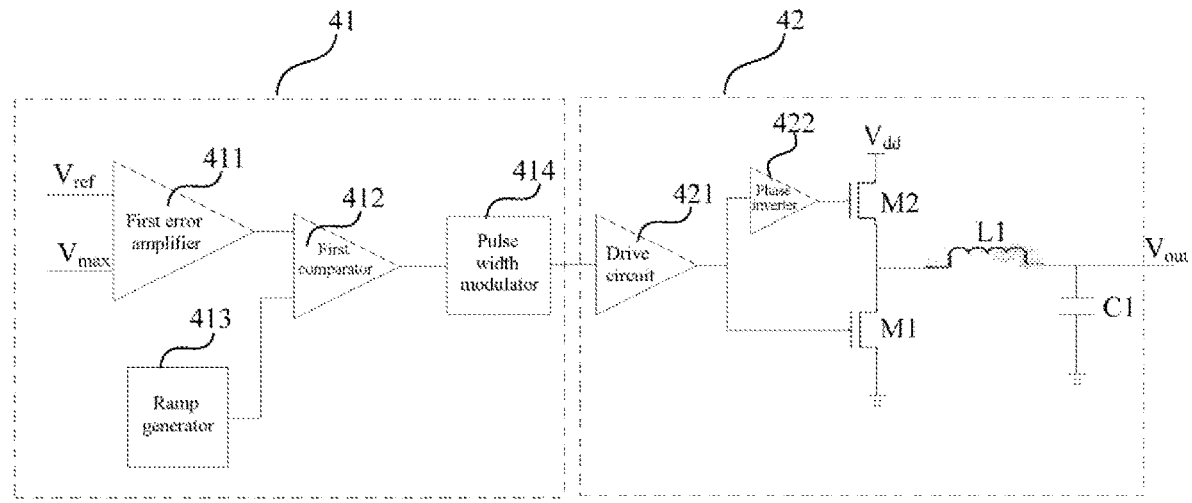
FIG. 5 is a first embodiment of a voltage conversion circuit according to the present disclosure.

In an example, as shown in FIG. 5, the pulse width modulation circuit 41 includes a first error amplifier 411. A first input end of the first error amplifier 411 is connected to a reference voltage. A second input end of the first error amplifier 411 is connected to the output end of the feedback voltage selection circuit 6. An output end of the first error amplifier 411 is connected to a first input end of a first comparator 412. A second input end of the first comparator 412 is connected to a ramp generator 413. An output end of the first comparator 412 is connected to an input end of a pulse width modulator 414. An output end of the pulse width modulator 414 is used as an output end of the pulse width modulation circuit 41.

In an example, as shown in FIG. 5, the output voltage adjustment circuit 42 includes a drive circuit 421. An input end of the drive circuit 421 is connected to the output end of the pulse width modulator 414. An output end of the drive circuit 421 is connected to an input end of a phase inverter 422 and a gate of a first MOS transistor M1. An output end of the phase inverter 422 is connected to a gate of a second MOS transistor M2. A first connection end of the second MOS transistor M2 is connected to a voltage $V_{dd}$. A second connection end of the second MOS transistor M2 is connected to a first connection end of the first MOS transistor M1, and connected to a first connection end of a first inductor L1. A second connection end of the first MOS transistor M1 is connected to a reference ground. A second connection end of the first inductor L1 is connected to a first connection end of a first capacitor C1, and is used as an output end of the output voltage adjustment circuit 42. A second connection end of the first capacitor C1 is connected to the reference ground.

As shown in FIG. 5, the pulse width modulation circuit outputs a dynamic error related to the maximum error result Vmax after amplifying an error by using the first error amplifier. Then the output dynamic error is compared with a ramp generated by the ramp generator, and is output as a square wave signal after PWM modulation. A duty cycle of the square wave signal is related to the maximum error result Vmax. A turn-on time of the second MOS transistor is controlled by using the square wave signal, thereby controlling a charging time of the first inductor and adjusting the output voltage, so that a voltage difference between the output voltage and the battery voltage is constantly the specified voltage difference Vs.

It should be noted that, the reference voltage Vref is a constant voltage value, which is used for error amplification with the maximum error result Vmax output by the feedback voltage selection circuit, so as to obtain the dynamic error of the system.

Figure 6:
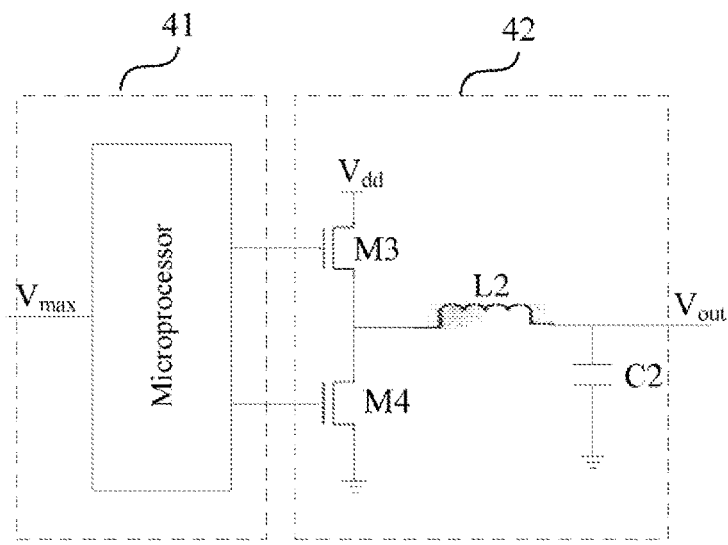
FIG. 6 is a second embodiment of a voltage conversion circuit according to the present disclosure.

In other examples, as shown in FIG. 6, the pulse width modulation circuit 41 is implemented by a microprocessor.

In other examples, as shown in FIG. 6, the output voltage adjustment circuit 42 includes a third MOS transistor M3. A gate of the third MOS transistor M3 is connected to the microprocessor. A first connection end of the third MOS transistor M3 is connected to a voltage Vdd. A second connection end of the third MOS transistor M3 is connected to a first connection end of a fourth MOS transistor M4, and connected to a first connection end of a second inductor L2. A gate of the fourth MOS transistor M4 is connected to the microprocessor. A second connection end of the fourth MOS transistor M4 is connected to a reference ground. A second connection end of the second inductor L2 is connected to a first connection end of a second capacitor C2, and used as an output end of the output voltage adjustment circuit 42. A second connection end of the second capacitor C2 is connected to the reference ground.

As shown in FIG. 6, the pulse width modulation circuit adjusts a duty cycle of an output signal thereof through related operations performed by the microprocessor. The pulse width modulation circuit controls the charging time of the second inductor L2 through controlling the turn-on time of the third MOS transistor, thereby adjusting the output voltage Vout, so that a voltage difference between the output voltage and the battery voltage is constantly the specified voltage difference Vs.

Figure 7:
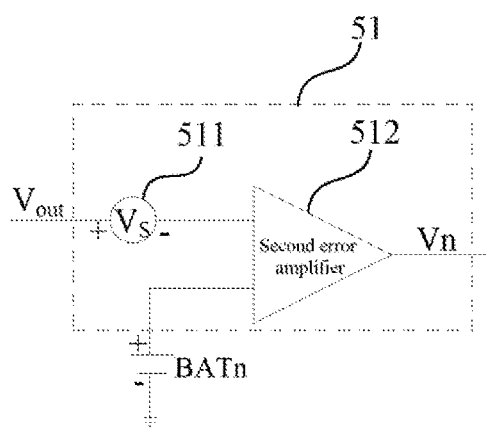
FIG. 7 is a first embodiment of a voltage detection circuit according to the present disclosure.

In an example, as shown in FIG. 7, the voltage detection circuit 5 includes N voltage detection units 51 with the same circuit structure. Each voltage detection unit is connected to the output end of the voltage conversion circuit 4 and a battery. The voltage detection unit 51 includes a first voltage source 511. A positive electrode of the first voltage source 511 is connected to the output end of the voltage conversion circuit 4. A negative electrode of the first voltage source 511 is connected to a first input end of a second error amplifier 512. A second input end of the second error amplifier 512 is connected to a positive electrode of a battery. An output end of the second error amplifier 512 is used as an output end of the voltage detection unit 51. A voltage of the first voltage source 511 is the specified voltage difference.

As shown in FIG. 7, the voltage detection unit performs error amplification on a battery voltage and a difference between the output voltage Vout and the specified voltage difference Vs, thereby obtaining a corresponding error result.

Figure 8:
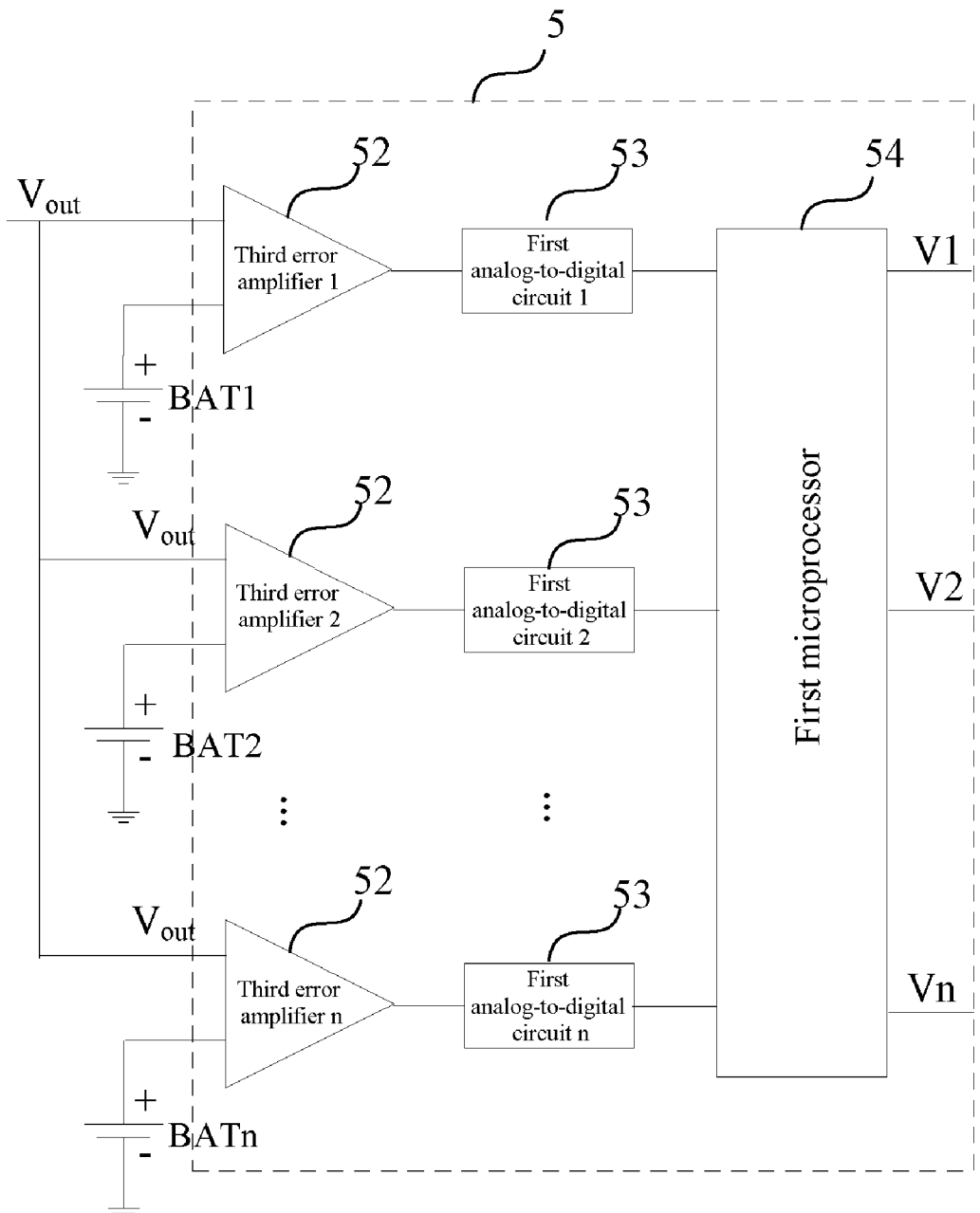
FIG. 8 is a second embodiment of a voltage detection circuit according to the present disclosure.

In other examples, as shown in FIG. 8, the voltage detection circuit 5 includes N third error amplifiers 52. First input ends of the N third error amplifiers 52 each is connected to the output end of the voltage conversion circuit 4. Second input ends of the N third error amplifiers 52 each is connected to one of the positive electrodes of N parallel batteries respectively. Output ends of the N third error amplifiers 52 each is connected to one of input ends of N first analog-to-digital conversion circuits 53 respectively. Output ends of the N first analog-to-digital conversion circuits 53 each is connected to a first microprocessor 54. The first microprocessor 54 is configured to compare N output signals output by the first analog-to-digital conversion circuits 53 with the specified voltage difference, and generate N error results.

As shown in FIG. 8, the voltage detection circuit amplifies voltage errors between the output voltage Vout and battery voltages by using third error amplifiers. Then the first analog-to-digital conversion circuit converts output signals of the third error amplifiers into digital signals, and inputs the N digital signals to the first microprocessor. The first microprocessor compares the N digital signals with the specified voltage difference, thereby generating N error results.

Preferably, a numerical range of the specified voltage difference is 1 mV to 900 mV. More preferably, in this embodiment, the specified voltage difference is 50 mV.

Figure 9:
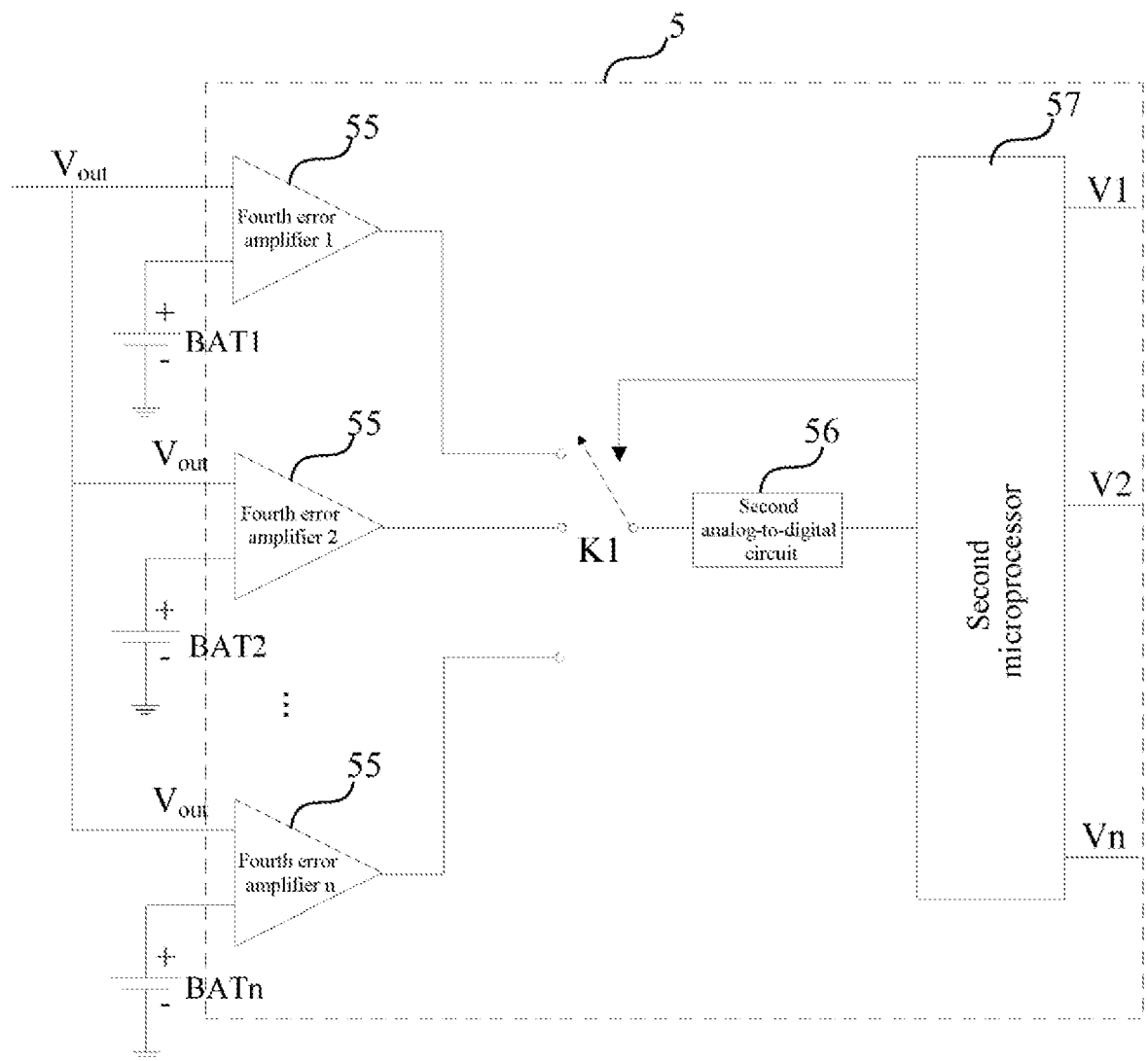
FIG. 9 is a third embodiment of a voltage detection circuit according to the present disclosure.

In another example, as shown in FIG. 9, the voltage detection circuit 5 includes N fourth error amplifiers 55. First input ends of the N fourth error amplifiers 55 each is connected to the output end of the voltage conversion circuit 4. Second input ends of the N fourth error amplifiers 55 each is connected to one of the positive electrodes of N parallel batteries respectively. Output ends of the N fourth error amplifiers 55 each is connected to a gating end of a gating switch K1. A connection end of the gating switch K1 is connected to an input end of a second analog-to-digital conversion circuit 56. An output end of the second analog-to-digital conversion circuit 56 is connected to a second microprocessor 57. The second microprocessor 57 is further connected to a control end of the gating switch K1. The second microprocessor 57 is configured to compare N output signals output by the second analog-to-digital conversion circuit 56 with the specified voltage difference and generate N error results.

As shown in FIG. 9, the voltage detection circuit amplifies voltage errors between the output voltage Vout and battery voltages by using the fourth error amplifiers, then outputs output signals of the N fourth error amplifiers by using the gating switch in a time division manner, converts the output signals into digital signals by using the second analog-to-digital conversion circuit, and inputs the digital signals to the second microprocessor. The second microprocessor compares the N digital signal with the specified voltage difference, thereby generating N error results.

Figure 10:
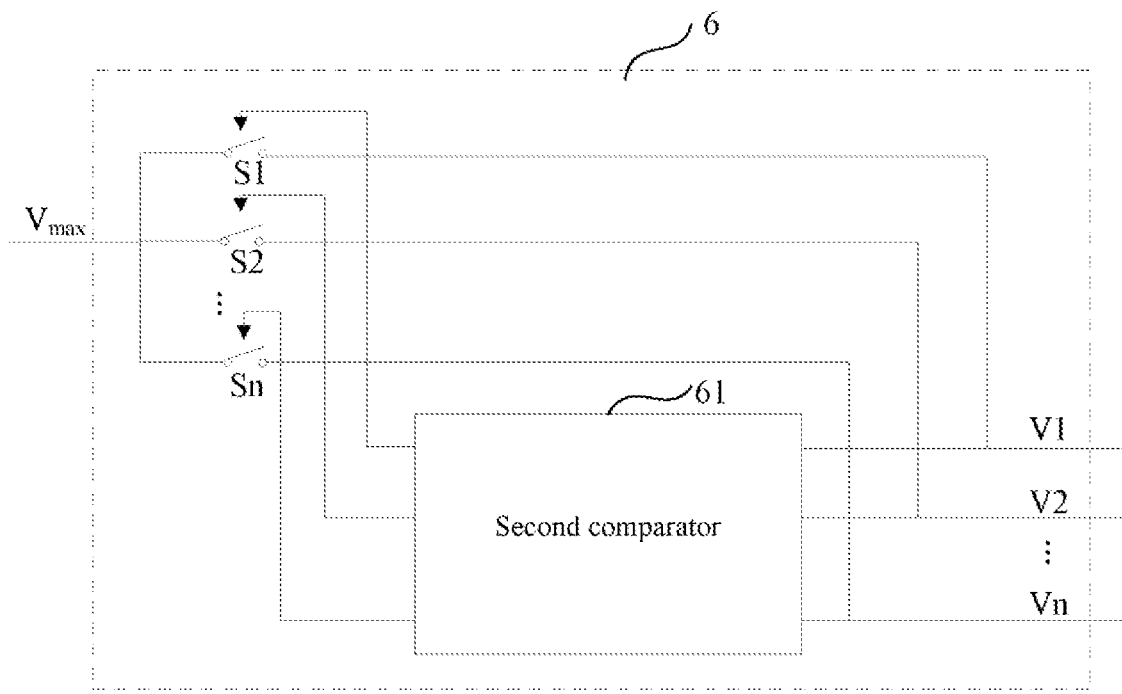
FIG. 10 is a first embodiment of a feedback voltage selection circuit according to the present disclosure.

In an example, as shown in FIG. 10, the feedback voltage selection circuit 6 includes a second comparator 61 and N switches S1-Sn. The second comparator 61 includes N input ends and N output ends. The N input ends of the second comparator 61 each is connected to one of the N output ends of the voltage detection circuit 5 in an one-to-one correspondence, and is connected to one of the first connection ends of the N switches S1-Sn in a one-to-one correspondence. The N output ends of the second comparator 61 each is connected to control ends of the N switches S1-Sn respectively. The second connection ends of the N switches S1-Sn are connected to each other, and used as the output end of the feedback voltage selection circuit 6.

As shown in FIG. 10, after the second comparator compares the N error results, a control signal is generated from the maximum error result, so as to control a switch corresponding to the output end, wherein the maximum error result is located, to be closed, thereby outputting the maximum error result Vmax.

In another example, the feedback voltage selection circuit 6 is implemented by using a microprocessor.

It should be noted that, the N error results are input to the microprocessor, and the N error results are compared by using the microprocessor, so that the maximum error result Vmax is output.

It should be noted that, when the voltage conversion circuit, the voltage detection circuit, and the feedback voltage selection circuit are all implemented by using microprocessors, the voltage conversion circuit, the voltage detection circuit, and the feedback voltage selection circuit may share one microprocessor.

Figure 11:
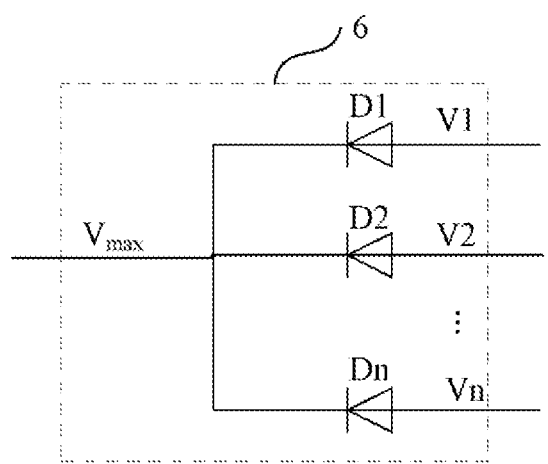
FIG. 11 is a second embodiment of a feedback voltage selection circuit in the present disclosure.

In another example, as shown in FIG. 11, the feedback voltage selection circuit 6 includes N diodes D1-Dn; each of the positive electrodes of the N diodes D1-Dn is connected to one of the N output ends of the voltage detection circuit 5 in a one-to-one correspondence, and negative electrodes of the N diodes D1-Dn are connected to each other, and used as the output end of the feedback voltage selection circuit 6.

As shown in FIG. 11, when the plurality of voltages are exerted on the positive electrodes of the diodes at the same time, a diode on a branch where the maximum error result is located is turned on, thereby outputting the maximum error result.

Figure 12:
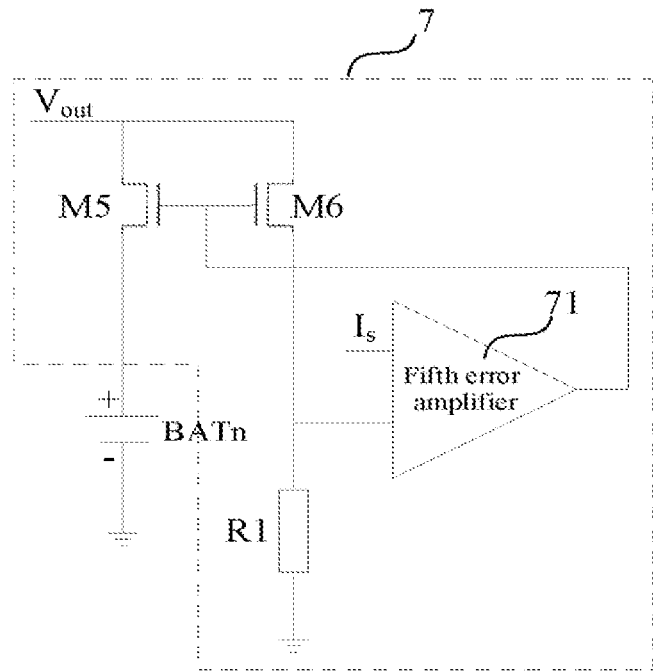
FIG. 12 is a first embodiment of a charging current control circuit according to the present disclosure.

In an example, as shown in FIG. 12, the charging current control circuit 7 includes a fifth MOS transistor M5, a sixth MOS transistor M6, a fifth error amplifier 71, and a first resistor R1. A first connection end of the fifth MOS transistor M5 is connected to a first connection end of the sixth MOS transistor M6, and is connected to the output end of the voltage conversion circuit 4. A second connection end of the fifth MOS transistor M5 is connected to a positive electrode of a battery. A second connection end of the sixth MOS transistor M6 is connected to a first input end of the fifth error amplifier 71 and a first connection end of the first resistor R1. A second connection end of the first resistor R1 is connected to a reference ground. A second input end of the fifth error amplifier 71 is connected to a specified current value. A gate of the fifth MOS transistor M5 is connected to a gate of the sixth MOS transistor M6, and is connected to an output end of the fifth error amplifier 71.

As shown in FIG. 12, the charging current control circuit samples a charging current of a charged battery by using the fifth MOS transistor M5 and the sixth MOS transistor M6, and inputs the charging current to the fifth error amplifier. The fifth error amplifier amplifies an error between the charging current and the specified current value Is, so that the battery is charged with a constant current having the specified current value Is.

Figure 13:
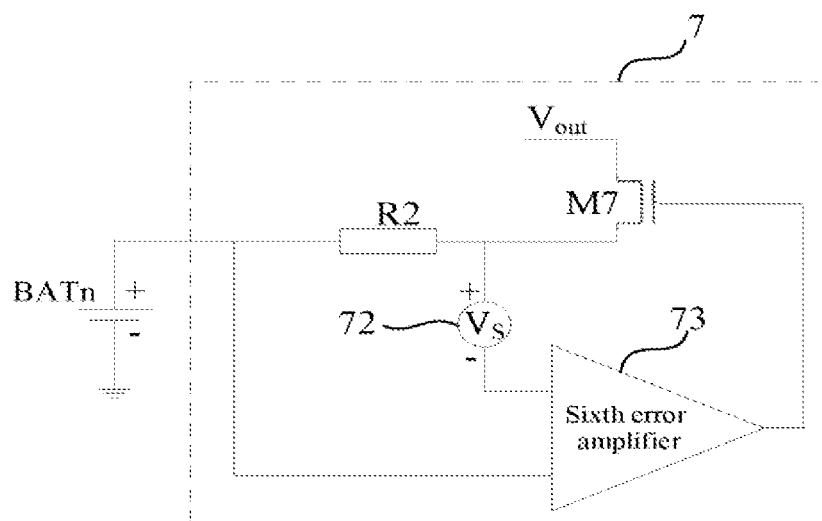
FIG. 13 is a second embodiment of a charging current control circuit according to the present disclosure.

In another example, as shown in FIG. 13, the charging current control circuit 7 includes a seventh MOS transistor M7. A first connection end of the seventh MOS transistor M7 is connected to the output end of the voltage conversion circuit 4. A second connection end of the seventh MOS transistor M7 is connected to a positive electrode of a second voltage source 72 and a first connection end of a second resistor R2. A negative electrode of the second voltage source 72 is connected to a first input end of a sixth error amplifier 73. A second connection end of the second resistor R2 is connected to a positive electrode of a battery and a second input end of the sixth error amplifier 73. An output end of the sixth error amplifier 73 is connected to a gate of the seventh MOS transistor M7. A voltage of the second voltage source 72 is the specified voltage difference.

In an example, the specified voltage difference Vs is equal to a product of the specified current value Is and the second resistor R2.

As shown in FIG. 13, the sixth error amplifier amplifies an error between the battery voltage and the specified voltage difference Vs, and control an on-resistance of the seventh MOS transistor M7 according to an error amplification result, so that the battery is charged with a constant current having the specified current value Is.

In other examples, the voltage conversion circuit 4 in FIG. 4, is implemented by a fixed 50% duty cycle switched capacitor circuits.

All switches S0/S1/S2 operate at 50% duty cycle, that is, 50% of the time in a cycle of switches S0/S1/S2 works in the Status A, and the remaining 50% of the time in a cycle works in the Status B. The switches S0/S1/S2 switches between Status A and Status B at a frequency of hundreds KHz, or even at a frequency of a few MHz, so as to switch the energy of the input end IN of the DC power supply to the output end OUT. When the capacitance of the capacitor C0 is equal to the capacitance of the capacitor C1, after the circuit is started, voltage of the output end is half of the voltage of the IN end of the DC power supply, so that the output voltage is adjusted at an equal proportion when the input voltage is adjusted.

Figure 14:
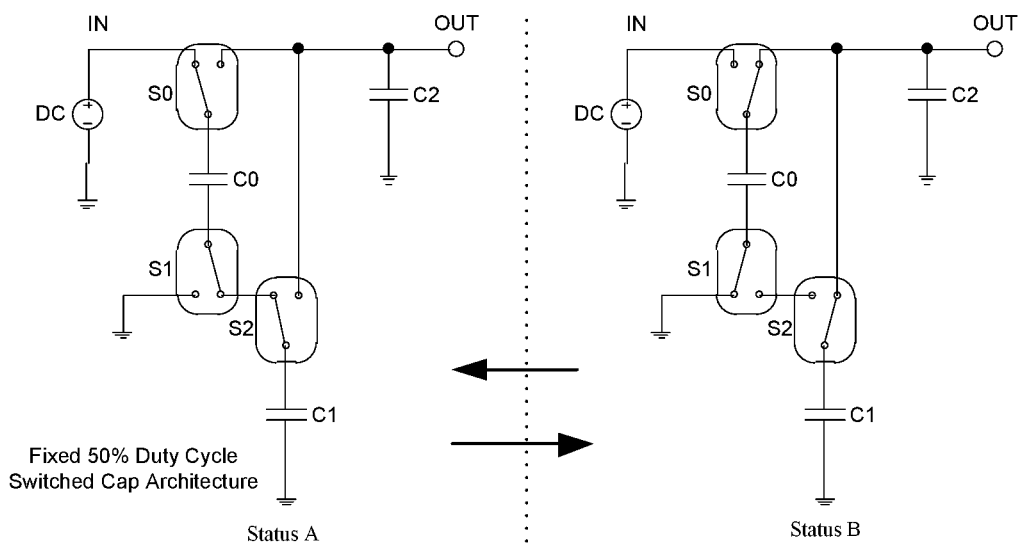
FIG. 14 is a circuit diagram of switched capacitor according to the present disclosure.

The operation of the switched capacitor in FIG. 14 is as follows. When the switched capacitor circuit operates in Status A, the switch S0 turns on the IN end and one end of the capacitor C0. At the same time, the switch S1/S2 turns on the other end of the capacitor C0, and one end of capacitor C1. The current flows into the capacitors C0 and C1 connected in series from the DC power supply. After the capacitor is charged, the sum of the voltage across the capacitor C0 and the voltage across the capacitor C1 is equal to the input voltage $V_{IN}$. When the switched capacitor circuit operates Status B, the switch S0 turns on the output end OUT and one end of the capacitor C0, the switch S2 turns on the output end OUT and one end of the capacitor C1, and the switch S1/S2 connect one end of the capacitor C0 and the capacitor C1 grounded. In Status B, capacitor C0 and capacitor C1 supply power to the output end with power stored therein.

The above switched capacitor circuit is operated repeatedly at a frequency freq. In Status A, the circuit is charged with capacitive energy from the input terminal. In Status B, the circuit discharge electrical energy to the output end. The output current is as follows:

$$Iout = C*(V_{IN} - 2*V_{OUT})*freq$$

C is capacity value of capacitor C0 or C1, $V_{IN}$ is the voltage of the input end IN, and $V_{OUT}$ is the voltage of the output end OUT. Generally, capacity value of capacitor C0 is equal to that of C1.

Embodiment 2

A charging method of the parallel battery charging circuit is disclosed. The charging method includes:

sampling battery voltages of N parallel batteries, and detecting errors between an output voltage and the battery voltages according to a specified voltage difference, to generate N error results;

comparing the N error results, and adjusting the output voltage according to a maximum error result, so that a voltage difference between the output voltage and a battery voltage corresponding to the maximum error result is the specified voltage difference, thereby starting charging from a battery with the lowest voltage; and sampling a battery voltage or a battery current of a charged battery, and detecting an error between the battery voltage or the battery current and the specified voltage difference or a specified current value, to adjust the charging current of the charged battery, so that the charging current is equal to the specified current value, thereby implementing constant current charging, wherein in N is an integer greater than or equal to 2.

In an example, in a constant current charging mode (that is, when the battery voltage is less than a battery fully-charged voltage), the voltage detection circuit detects errors between the output voltage $V_{out}$ and the battery voltages of the N parallel batteries according to the specified voltage difference $V_s$, and generates N error results V1-Vn. The feedback voltage selection circuit compares the N error results V1-Vn to obtain a maximum error result $V_{max}$. The voltage conversion circuit adjusts the output voltage $V_{out}$ according to the maximum error result $V_{max}$, so that a difference between the output voltage $V_{out}$ and a battery voltage (that is, the lowest battery voltage) corresponding to the maximum error result is constantly the specified voltage difference $V_s$, thereby starting charging from the battery with the lowest voltage. Moreover, the charging current control circuit adjusts a charging current, so that the charging current is equal to a specified current value Is, thereby implementing constant current charging.

Specifically, after a current is charged to the battery with the lowest voltage, the voltage of the battery rises. The voltage output by the voltage conversion circuit is adjusted by a voltage adjustment circuit formed by the voltage detection circuit, the feedback voltage selection circuit, and the voltage conversion circuit, so that the voltage also rises. When the output voltage Vout of the voltage conversion circuit becomes higher than that of a battery with the second lowest voltage, charging for the battery with the second lowest voltage is started. In this case, the battery with the lowest voltage and the battery with the second lowest voltage are charged at the same time. As the charging for the battery continues, voltages of the battery with the lowest voltage and the battery with the second lowest voltage rise, the output voltage Vout of the voltage conversion circuit rises accordingly. When the output voltage becomes higher than that of a battery with the third lowest voltage, charging for the battery with the third lowest voltage is started. In this case, the battery with the lowest voltage, the battery with the second lowest voltage, and the battery with the third lowest voltage are charged at the same time. Similarly, as the charging continues, the output voltage of the voltage conversion circuit rises accordingly. When the output voltage is higher than all battery voltages, N parallel batteries are rapidly charged at the same time.

It should be noted that, charging for the battery with the lowest voltage is started first, so as to ensure that the maximum voltage difference between the output voltage of the only voltage conversion circuit and the battery voltage of the charged battery does not exceed the specified voltage difference. That is, the maximum voltage difference is less than or equal to the specified voltage difference, thereby reducing the loss during charging, reducing heat generated by the battery during charging, and improving the charging efficiency.

In an example, the charging method further includes a constant voltage charging mode. In the constant voltage charging mode, the battery voltage is continuously increased to a battery fully-charged voltage, and the charging current is gradually decreased. When the charging current is decreased to a specified charging cutoff current, charging of the battery is completed.

It should be noted that, with the charging of the current, the battery voltage rises. When the battery charging changes into a constant voltage charging mode from the constant current charging mode (that is, when the battery voltage is close to a battery fully-charged voltage), the error result output by the voltage detection circuit is no longer used as a feedback quantity in a feedback circuit. In this case, the circuit feedback quantity has become the battery voltage. As the battery voltage continuously approaches the battery fully-charged voltage, the difference between the output voltage and the battery voltage is decreased continuously, which causes the charging current of each battery to be continuously decreased as well. When the charging current of each battery is decreased to the specified charging cutoff current, charging for each battery is ended.

The stability and feasibility of the difference feedback circuit formed by the voltage conversion circuit, the charging current control circuit, and the feedback voltage selection circuit are analyzed in the following. Specific analyses are as follows:

voltage difference output to the feedback voltage selection circuit ($\Delta V$)=output voltage ($V_{out}$)−battery voltage ($V_{BAT}$)

that is, $\Delta V = V_{out} - V_{BAT}$ \hfill (1)

The purpose of forming a feedback is to obtain the voltage difference and maintain the voltage difference to be a smaller direct-current constant value $\Delta V$, so as to improve the charging efficiency of the battery and reduce heat. That is, $\Delta V$ is a direct-current constant value, such as 50 mV. Under this condition, the equation (1) may evolve to:

$$V_{out} = V_{BAT} + \Delta V \quad (2)$$

$\Delta V$ is a direct-current constant value, a dynamic small-signal analysis is performed on both sides of the equation. Differential operations are performed on both sides of the equation (2) at the same time, wherein a differential value of the direct-current constant value $\Delta V$ is zero. A differential operation of the equation (2) is:

$$\Delta V_{out} = \Delta V_{BAT} \quad (3)$$

It can be learned clearly from the equation (3) that, the differential feedback circuit is similar to the feedback circuit of the battery voltage $V_{BAT}$. That is, the voltage difference between the output voltage $V_{out}$ of the voltage conversion circuit and the battery voltage $V_{BAT}$ which feeds back to the circuit does not affect the circuit stability of the whole charging system. As can be seen, the differential feedback circuit in the present disclosure is stable, feasible, and easy to implement.

In conclusion, the parallel battery charging circuit and charging method thereof according to the present disclosure have the following beneficial effects:

1. According to the present disclosure, the voltage difference between the output voltage and the battery voltage corresponding to the maximum error result is a specified voltage difference, so that charging is started from a battery with the lowest voltage. Moreover, the specified voltage difference is small, the voltage difference between the charging voltage and the battery voltage is made to be as small as possible, so that the battery is charged rapidly and efficiently, and less heat is generated.

2. In the present disclosure, a charging current control circuit is disposed for each battery, the charging current of each battery is precisely controlled, which can prevent the charging current of one of the batteries from being excessively high caused by internal resistance changing after battery aging, thereby avoiding the battery generating too much heat.

3. The circuit in the present disclosure includes only one voltage conversion circuit. The circuit has a high integration. The chip has fewer peripheral components, thereby saving a lot of space and costs.

Therefore, the present disclosure effectively overcomes various disadvantages in the prior art and hence achieves high industrial use value.

The foregoing embodiments are only to illustrate the principle and efficacy of the present disclosure exemplarily, and are not to limit the present disclosure. Any person skilled in the art can make modifications or variations on the foregoing embodiments without departing from the spirit and scope of the present disclosure. Accordingly, all equivalent modifications or variations completed by a person of ordinary skill in the art without departing from the spirit and technical thinking disclosed by the present disclosure should fall within the scope of claims of the present disclosure.

What is claimed is:

1. A parallel battery charging circuit, comprising:
   a voltage conversion circuit, configured to adjust an output voltage according to a maximum error result output by a feedback voltage selection circuit, so that a voltage difference between the output voltage and a battery voltage corresponding to the maximum error result is a specified voltage difference, thereby starting charging from a battery with the lowest voltage;
   a voltage detection circuit, connected to an output end of the voltage conversion circuit and positive electrodes of N batteries, wherein the voltage detection circuit is configured to sample battery voltages of the N batteries, and detect errors between the output voltage and N battery voltages according to the specified voltage difference, to generate and output N error results;
   a feedback voltage selection circuit, having an input end connected to the voltage detection circuit and an output end connected to the voltage conversion circuit, wherein the feedback voltage selection circuit is configured to compare the N error results output by the voltage detection circuit, and output a maximum error result; and
   N charging current control circuits, wherein each charging current control circuit is connected to the output end of the voltage conversion circuit and a positive electrode of a battery, the charging current control circuit is configured to sample a battery voltage or a battery current of the charged battery, detect an error between the battery voltage and the specified voltage difference, or the error between the battery current and a specified current value, to adjust the charging current of the charged battery, so that the charging current is equal to the specified current value, thereby implementing constant current charging;
   wherein N is an integer greater than or equal to 2.

2. The parallel battery charging circuit as in claim 1, wherein the voltage conversion circuit comprise a switched capacitor circuit;
   the switched capacitor circuit has a fixed 50% duty cycle;
   the switched capacitor circuit is operated repeatedly at a frequency freq;
   in a Status A, the circuit is charged with capacitive energy from the input terminal;
   in a Status B, the circuit discharge electrical energy to the output end;
   the output current is as follows:

$Iout=C*(V_{IN}-2*V_{OUT})*freq,$

C is capacity value of capacitor C0 or C1, $V_{IN}$ is a voltage of the input end, and $V_{OUT}$ is a voltage of the output end.

3. The parallel battery charging circuit as in claim 1, wherein the voltage conversion circuit comprises:
   a pulse width modulation circuit, connected to the feedback voltage selection circuit, the pulse width modulation circuit is configured to adjust a duty cycle of an output signal of the pulse width modulation circuit according to the maximum error result output by the feedback voltage selection circuit; and
   an output voltage adjustment circuit, connected to the pulse width modulation circuit, the output voltage adjustment circuit is configured to adjust the output voltage according to the output signal of the pulse width modulation circuit, so that the voltage difference between the output voltage and the battery voltage corresponding to the maximum error result is the specified voltage difference.

4. The parallel battery charging circuit as in claim 3, wherein the pulse width modulation circuit comprises a first error amplifier; a first input end of the first error amplifier is connected to a reference voltage; a second input end of the first error amplifier is connected to the output end of the feedback voltage selection circuit; an output end of the first error amplifier is connected to a first input end of a first comparator; a second input end of the first comparator is connected to a ramp generator; an output end of the first comparator is connected to an input end of a pulse width modulator; and an output end of the pulse width modulator is used as an output end of the pulse width modulation circuit.

5. The parallel battery charging circuit as in claim 4, wherein the output voltage adjustment circuit comprises a drive circuit; an input end of the drive circuit is connected to the output end of the pulse width modulator; an output end of the drive circuit is connected to an input end of a phase inverter and a gate of a first MOS transistor; an output end of the phase inverter is connected to a gate of a second MOS transistor; a first connection end of the second MOS transistor is connected to a voltage $V_{dd}$; a second connection end of the second MOS transistor is connected to a first connection end of the first MOS transistor, and connected to a first connection end of a first inductor; a second connection end of the first MOS transistor is connected to a reference ground; a second connection end of the first inductor is connected to a first connection end of a first capacitor and used as an output end of the output voltage adjustment circuit; and a second connection end of the first capacitor is connected to the reference ground.

6. The parallel battery charging circuit as in claim 3, wherein the pulse width modulation circuit is implemented by using a microprocessor.

7. The parallel battery charging circuit as in claim 6, wherein the output voltage adjustment circuit comprises a third MOS transistor; a gate of the third MOS transistor is connected to the microprocessor; a first connection end of the third MOS transistor is connected to a voltage $V_{dd}$; a second connection end of the third MOS transistor is connected to a first connection end of a fourth MOS transistor and connected to a first connection end of a second inductor; a gate of the fourth MOS transistor is connected to the microprocessor; a second connection end of the fourth MOS transistor is connected to a reference ground; a second connection end of the second inductor is connected to a first connection end of a second capacitor and used as an output end of the output voltage adjustment circuit; and a second connection end of the second capacitor is connected to the reference ground.

8. The parallel battery charging circuit as in claim 1, wherein the voltage detection circuit comprises N voltage detection units with the same circuit structure, and each voltage detection unit is connected to the output end of the voltage conversion circuit and a battery; the voltage detection unit comprises a first voltage source; a positive electrode of the first voltage source is connected to the output end of the voltage conversion circuit; a negative electrode of the first voltage source is connected to a first input end of a second error amplifier; a second input end of the second error amplifier is connected to a positive electrode of a battery; an output end of the second error amplifier is used as an output end of the voltage detection unit; and a voltage of the first voltage source is the specified voltage difference.

9. The parallel battery charging circuit as in claim 1, wherein the voltage detection circuit comprises N third error amplifiers; each of the first input ends of the N third error amplifiers is connected to the output end of the voltage conversion circuit; each of the second input ends of the N third error amplifiers are connected to positive electrodes of N parallel batteries; output ends of the N third error amplifiers are connected to input ends of N first analog-to-digital conversion circuits respectively; each of the output ends of the N first analog-to-digital conversion circuits are connected to a first microprocessor; and the first microprocessor is configured to compare N output signals output by the first analog-to-digital conversion circuits with the specified voltage difference and generate N error results.

10. The parallel battery charging circuit as in claim 1, wherein the voltage detection circuit comprises N fourth error amplifiers; first input ends of the N fourth error amplifiers are connected to the output end of the voltage conversion circuit; second input ends of the N fourth error amplifiers are connected to positive electrodes of N parallel batteries respectively; output ends of the N fourth error amplifiers are connected to a gating end of a gating switch; a connection end of the gating switch is connected to an input end of a second analog-to-digital conversion circuit; an output end of the second analog-to-digital conversion circuit is connected to a second microprocessor; the second microprocessor is further connected to a control end of the gating switch; and the second microprocessor is configured to compare N output signals output by the second analog-to-digital conversion circuit with the specified voltage difference and generate N error results.

11. The parallel battery charging circuit as in claim 1, wherein the feedback voltage selection circuit comprises a second comparator and N switches; the second comparator comprises N input ends and N output ends; the N input ends of the second comparator each is connected to one of the N output ends of the voltage detection circuit in an one-to-one correspondence, and connected to one of the first connection ends of the N switches in an one-to-one correspondence; the N output ends of the second comparator are connected to control ends of the N switches respectively; and second connection ends of the N switches are connected to each other and used as the output end of the feedback voltage selection circuit.

12. The parallel battery charging circuit as in claim 1, wherein the feedback voltage selection circuit is implemented by using a microprocessor.

13. The parallel battery charging circuit as in claim 1, wherein the feedback voltage selection circuit comprises N diodes; positive electrodes of the N diodes each is connected to one of the N output ends of the voltage detection circuit in an one-to-one correspondence, and negative electrodes of the N diodes are connected to each other and used as the output end of the feedback voltage selection circuit.

14. The parallel battery charging circuit as in claim 1, wherein the charging current control circuit comprises a fifth MOS transistor, a sixth MOS transistor, a fifth error amplifier, and a first resistor; a first connection end of the fifth MOS transistor is connected to a first connection end of the sixth MOS transistor, and connected to the output end of the voltage conversion circuit; a second connection end of the fifth MOS transistor is connected to a positive electrode of a battery; a second connection end of the sixth MOS transistor is connected to a first input end of the fifth error amplifier and a first connection end of the first resistor; a second connection end of the first resistor is connected to a reference ground; a second input end of the fifth error amplifier is connected to a specified current value; a gate of the fifth MOS transistor is connected to a gate of the sixth MOS transistor, and is connected to an output end of the fifth error amplifier.

15. The parallel battery charging circuit as in claim 1, wherein the charging current control circuit comprises a seventh MOS transistor; a first connection end of the seventh MOS transistor is connected to the output end of the voltage conversion circuit; a second connection end of the seventh MOS transistor is connected to a positive electrode of a second voltage source and a first connection end of a second resistor; a negative electrode of the second voltage source is connected to a first input end of a sixth error amplifier; a second connection end of the second resistor is connected to a positive electrode of a battery and a second input end of the sixth error amplifier; an output end of the sixth error amplifier is connected to a gate of the seventh MOS transistor; and a voltage of the second voltage source is the specified voltage difference.

16. A charging method for the parallel batteries, comprising:
sampling battery voltages of N parallel batteries, and detecting errors between an output voltage and the battery voltages according to a specified voltage difference, to generate N error results;
comparing the N error results, and adjusting the output voltage according to a maximum error result, so that a voltage difference between the output voltage and a battery voltage corresponding to the maximum error result is the specified voltage difference, thereby starting charging from a battery with the lowest voltage; and
sampling a battery voltage or a battery current of the charged battery, detecting an error between the battery voltage or the battery current and the specified voltage difference or a specified current value, to adjust the charging current of the charged battery, so that the charging current is equal to the specified current value, thereby implementing constant current charging,
wherein N is an integer greater than or equal to 2.

17. The charging method of the parallel battery charging circuit as in claim 16, further comprising:

a constant voltage charging mode, wherein in the constant voltage charging mode, the battery voltage is continuously increased to a battery fully-charged voltage, the charging current is gradually decreased; when the charging current is decreased to a specified charging cutoff current, charging of the battery is completed.

\* \* \* \* \*